United States Patent
Kluth et al.

(10) Patent No.: US 6,359,023 B1
(45) Date of Patent: Mar. 19, 2002

(54) POLYURETHANE PREPOLYMER CONTAINING NCO GROUPS

(75) Inventors: Hermann Kluth, Duesseldorf; Wolfgang Klauck, Meerbusch; Johann Klein, Duesseldorf; Wilfried Huebner, Langenfeld, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/011,521

(22) PCT Filed: Aug. 1, 1996

(86) PCT No.: PCT/EP96/03384

§ 371 Date: Feb. 10, 1998

§ 102(e) Date: Feb. 10, 1998

(87) PCT Pub. No.: WO97/06196

PCT Pub. Date: Feb. 20, 1997

(30) Foreign Application Priority Data

Aug. 10, 1995 (DE) .......................................... 195 29 406

(51) Int. Cl.⁷ .............................................. C08G 18/00
(52) U.S. Cl. ....................... 521/155; 521/107; 521/156; 521/172; 521/173; 521/129; 521/157; 524/100; 524/247; 524/251; 524/96; 528/73; 528/74.5; 560/330
(58) Field of Search ................................. 521/125, 107, 521/129, 156, 172, 173; 560/330; 524/100, 247, 251, 96; 528/73, 74.5

(56) References Cited

U.S. PATENT DOCUMENTS

| 3,045,034 A | | 7/1962 | Zankl et al. ............. 260/404.5 |
|---|---|---|---|
| 3,624,044 A | * | 11/1971 | Wu ............................... 528/72 |
| 3,635,848 A | * | 1/1972 | Rambosek ................... 521/105 |
| 4,508,853 A | | 4/1985 | Kluth et al. ................. 521/107 |
| 4,742,087 A | | 5/1988 | Kluth et al. ................. 521/107 |
| 5,324,754 A | * | 6/1994 | Valoppi et al. ............. 521/125 |

FOREIGN PATENT DOCUMENTS

| DE | 36 26 223 | 2/1988 |
|---|---|---|
| DE | 41 28 649 | 3/1993 |
| DE | 43 41 264 | 6/1995 |
| EP | 0 107 402 | 5/1984 |
| EP | 0 125 579 | 11/1984 |
| EP | 0 256 355 | 2/1988 |
| EP | 0 603 597 | 6/1994 |
| JP | 48 012 347 | 2/1973 |

* cited by examiner

Primary Examiner—Gary Geist
Assistant Examiner—Taylor V Oh
(74) Attorney, Agent, or Firm—Wayne C. Jaeschke; Stephen D. Harper; Daniel S. Ortiz

(57) ABSTRACT

Described is an NCO-group-containing polyurethane prepolymer made from polyisocyanates and polyols derived from natural oils. The invention is characterized in that the polyol is obtained by transesterification in the presence of basic lithium compounds. Together with a tertiary amine used to accelerate the moisture curing, the storage stability is thus increased considerably. Up to 4.0 mmol of the lithium compound is used per kilogram of polyol, and 0.1 to 2.0% by wt. of the amine, relative to the total weight of the composition, is used as the accelerator. The polyurethane prepolymer is suitable not only for the production of adhesives but also for the production of foamed materials, in particular those dispensed from throw-away pressure vessels.

9 Claims, No Drawings

POLYURETHANE PREPOLYMER CONTAINING NCO GROUPS

This invention relates to a moisture-curing polyurethane prepolymer of oleochemical polyols and polyisocyanates. The invention also relates to the use of this prepolymer in moisture-curing adhesives and foams, more particularly in foams produced from non-reusable pressurized containers using blowing gases liquefied under pressure.

BACKGROUND OF THE INVENTION

Polyurethane prepolymers of the type in question are known. Thus, in EP 125 579, the oleochemical polyols are obtained from epoxidized triglycerides by reaction with low molecular weight monoalcohols, for example by reaction of epoxidized soybean oil with methanol or ethanol. This ring-opening reaction is accelerated by acidic catalysts which, on completion of the reaction, are neutralized with a basic substance, preferably with an amine. Together with polyisocyanates, these oleochemical polyols form NCO prepolymers with a considerable, but not always adequate storage stability when known tertiary amines are added as accelerators for the reaction of the NCO groups with water.

Corresponding polyurethane prepolymers are described in DE 36 26 223. The polyols used in this document are preferably ring opening products of epoxidized oils with monoalcohols. In this case, however, the epoxide groups are completely reacted. In addition, the triglyceride obtained, which contains secondary OH groups and OR groups, is additionally reacted with excess monoalcohol. A mixture of partial glycerides with unreacted triglyceride is formed in this transesterification reaction. These polyols are also produced in the presence of acid catalysts. Finally, the catalyst is again neutralized with an amine. These oleochemical polyols also form polyurethane prepolymers with inadequate stability in storage, particularly when the usual catalysts are present in relatively high concentrations for the moisture curing process.

Polyether polyols obtained by addition of alkylene oxides to low molecular weight diols or triols in the presence of alkaline compounds also form moisture-curing polyurethane prepolymers with limited stability in storage after reaction with polyisocyanates. This applies, for example, to polyols of propylene oxide and/or ethylene oxide and glycerol or trimethylol propane in the presence of NaOH, KOH, MeONa and MeOK in concentrations of more than 10 ppm metal content. Accordingly, to obtain satisfactory storage stability with polyols such as these, the alkali metal content of the polyols is reduced by additional purification measures to concentrations of about 5 ppm Na or K.

Accordingly, there is a need for polyurethane polymers having improved stability in storage for otherwise the same production and performance properties.

DETAILED DESCRIPTION OF THE INVENTION

The solution provided by the invention is defined in the claims and consists essentially in the use of basic lithium compounds in the production of polyols, more particularly oleochemical polyester polyols.

Accordingly, the polyurethane prepolymer containing NCO groups according to the invention of oleochemical polyols and polyisocyanates is characterized in that it contains up to 14 ppm of lithium and 0.1 to 2.0% by weight of a tertiary amine to accelerate the moisture curing process and is free from Na, K and other amines, particularly salts thereof with strong acids.

N-substituted morpholines above all are suitable for accelerating the reaction of water with NCO groups. Specific examples include 2,2'-dimorpholinodiethyl ether, N-ethyl morpholine, 2,2-bis-(dimethylaminodiethyl)-ether or mixtures of the compounds mentioned. 2,2'-dimorpholinodiethyl ether (DMDEE) is preferably used. These catalysts are particularly suitable because they catalyze above all the curing reaction and, to a lesser extent, the polymerization of the NCO groups (trimerization) or the urethanization reaction. The catalysts are used in a concentration of 0.1 to 2.0% by weight, preferably in a concentration of 0.2 to 1.2% by weight and more preferably in a concentration of 0.5 to 1.0% by weight, based on the prepolymer as a whole. They are generally added to the polyol or to the polyisocyanate before the prepolymerization.

The lithium is used as a basic lithium compound. Basic lithium compounds in the context of the invention are understood to be the hydroxides and alcoholates. However, compounds, such as lithium acetate, lithium oxides and Li metal, may also be used. They are employed in a concentration of 0.1 to 4.0 and preferably 0.5 to 2.0 mmole/kg polyol. This corresponds to a concentration of 0.35 to 14 and preferably 1.75 to 7.0 ppm of lithium in the polyurethane prepolymer. The lithium compound may be added to the reaction mixture as a basic transesterification catalyst either before or during the transesterification reaction. However, where the transesterification is acid-catalyzed, the acid may be neutralized with the lithium compound.

The oleochemical polyols preferably used are polyols containing ester groups which are derived from natural fats and oils. Accordingly, they contain structural elements of fatty acids and fatty alcohols. Starting materials for the oleochemical polyols of the polyurethane prepolymers according to the invention are fats and/or oils of vegetable and/or animal origin with preferably unsaturated fatty acid residues. Specific examples are castor oil, rapeseed oil and soybean oil. However, beef tallow, palm oil, peanut oil, sunflower oil and fish oil may also be used. These starting fats are preferably epoxidized and transesterified. Of the epoxidized triglycerides, epoxidized soybean oil is preferably used. The epoxidation and the reaction with alcohols or carboxylic acids is known (see, for example, EP 125 579 and DE 36 26 223). The polyols formed contain ether groups besides the ester groups.

To produce the polyester polyols according to the invention, polyhydric alcohols with a functionality of 2 to 4 are required in addition to the fats and oils. They have a molecular weight below 400. Suitable polyhydric alcohols are, for example, glycol, glycerol, pentaerythritol and trimethylol propane. Besides these polyhydric alcohols, dicarboxylic acids may also be used in small amounts. Specific examples are adipic acid, phthalic acid, isophthalic acid, terephthalic acid, glutaric acid, succinic acid, azelaic acid, dimer fatty acid and mixtures thereof.

The esterification is carried out under conditions known per se.

After the transesterification, the oleochemical polyols to be used in accordance with the invention have an OH value of 100 to 400 and preferably in the range from 150 to 350.

Besides these oleochemical polyols, the polyisocyanates are the second important structural element for the polyurethane prepolymers according to the invention.

Particularly suitable isocyanates are aromatic polyisocyanates based on MDI (methylene-bis-diphenyl isocyanate or diphenylmethane-4,4'-diisocyanate). Mixtures of MDI with relatively high molecular weight homologs having an average isocyanate functionality of 2.3 to 2.8 are particularly suitable. Other aromatic isocyanates include NDI and TDI. Cycloaliphatic isocyanates, such as IPDI, $H_{12}$-MDI, and aliphatic diisocyanates, such as tetramethylene diisocyanate and hexamethylene diisocyanate, are also suitable.

The oleochemical polyol and the polyisocyanate are used in a quantity ratio which corresponds to a molar ratio of OH to isocyanate groups of 1:3 to 1:11 and, more particularly, 1:4 to 1:6.

The reaction between the oleochemical polyol and the polyisocyanate is normally carried out at a temperature of 0 to 100° C. and preferably at a temperature of 15 to 50° C. Catalysts for the reaction of the isocyanate groups with the OH groups are generally not necessary. However, catalysts may be added in small quantities to control the reaction, accelerating the reaction of the isocyanate group with the OH group, but not the trimerization thereof. Specific examples are dimorpholinodiethyl ether, bis-(dimethyl-aminoethyl)-ether, Dabco X-DM (Air Products) and N-ethyl morpholine. However, other catalysts may also be used providing they do not trimerize the isocyanate groups in storage, for example N-substituted morpholines and mixtures thereof with propylene oxide adducts of triethanolamine and the known metal catalysts, particularly tin.

The polyurethane prepolymer has an NCO functionality of 2 to 5 and more particularly 2.5 to 4.2, and an NCO content of 8 to 30% by weight and, more particularly, 10 to 23% by weight, based on the prepolymer, and a viscosity of 5 to 200 and, more particularly, 10 to 100 Pas at 25° C. (as measured in accordance with DIN 53015).

To produce polyurethane foams, at least one amine catalyst for the reaction of the isocyanate group with the OH groups (including water), at least one blowing agent and at least one foam stabilizer are required in addition to the polyurethane prepolymer. In addition, other additives may be incorporated, including for example solvents, flameproofing agents, plasticizers, cell regulators, emulsifiers, fungicides, fillers, pigments and antiagers. The composition is a solution or emulsion.

1,1,1,2-Tetrafluoroethane, 1,1-difluoroethane and dimethyl ether is preferably used as the blowing agent. However, carbon dioxide, dinitrogen oxide, n-propane, n-butane and isobutane may also be used. Preferred blowing agents and solvents are chlorine-free fluorocarbons with boiling points of −40 to +60° C., propane/butane mixtures and dimethyl ether or mixtures thereof.

The foam-forming composition additionally contains stabilizers. "Stabilizers" in the context of the present invention are understood to be on the one hand stabilizers which stabilize the viscosity of the composition during production, storage and application. Suitable stabilizers of this type are, for example, monofunctional carboxylic acid chlorides, monofunctional highly reactive isocyanates and non-corrosive inorganic acids. Examples include benzoyl chloride, toluene sulfonyl isocyanate, phosphoric acid or phosphorous acid.

On the other hand, stabilizers in the context of the present invention are also antioxidants, UV stabilizers or hydrolysis stabilizers. The choice of these stabilizers is determined on the one hand by the principal components of the composition and, on the other hand, by the application conditions and by the loads which the foam plastic is expected to withstand. If the main chain of the polyurethane prepolymer is made up of polyether units, antioxidants—optionally in combination with UV stabilizers—are mainly necessary. Examples of suitable antioxidants are the commercially available sterically hindered phenols and/or thioethers and/or substituted benzotriazoles and sterically hindered amines of the HALS (hindered amine light stabilizer) type.

If the main chain of the polyurethane prepolymer consists mainly of polyester units, hydrolysis stabilizers, for example of the carbodiimide type, are preferably used.

Preferred foam stabilizers are siloxane/oxyalkylene copolymers, for example Tegostab B 8404 (Goldschmidt), Dabco DC-190 or Dabco DC-193 (Air Products).

Quantitatively, the foam-forming composition preferably has the following composition:

50 to 90 and preferably 60 to 85% by weight of isocyanate prepolymers, 0.1 to 2.0 and preferably 0.2 to 1.2 of catalysts, 5 to 35 and preferably 10 to 25 of blowing agents and 0.1 to 5.0 and preferably 0.5 to 3.0 of foam stabilizer.

Of the optional additives, the flameproofing agent may be added in a quantity of 5 to 50 and preferably 10 to 30. The other optional additives may be added in a quantity of 0.1 to 3.0 and, more particularly, 0.2 to 1.5. These figures represent percentages by weight, based on the composition as a whole.

The foam-forming compositions enable a one-component foam plastic to be produced from a pressurized container, the foam thus produced curing in the usual way on contact with atmospheric moisture. However, two-component foam plastics may also readily be produced where a polyol is added to the composition in equivalent quantities or slightly less than the equivalent quantity. The polyol used is any of the polyols normally used containing 2 to 6 carbon atoms and 2 or 3 preferably primary OH groups.

The foam plastic thus produced is particularly suitable for insulation, assembly and sealing in the building industry, particularly in situ.

The polyurethane prepolymer according to the invention is also suitable for the production of adhesives. They consist essentially of the polyurethane prepolymer and the amine catalyst. There is no need for blowing agents or foam stabilizers.

The polyurethane prepolymer according to the invention is distinguished by high stability in storage. By stability in storage is meant in particular a stable viscosity at storage temperatures of 20 to 50° C. In order to be able to compare the storage stabilities of various systems, the viscosity of the polymers is measured after prepolymerization and after various periods of storage at 20° C. (room temperature) and 50° C. The viscosity measurement itself is carried out at 25° C. with a Brookfield viscosimeter of the RVT type. On account of the different initial viscosities, the percentage increase in the initial viscosity per month of storage (=30 days) rather than the absolute increase in viscosity is used as the characteristic quantity for storage stability. This calculated quantity is referred to as the rise in viscosity. In the case of the described polyurethane prepolymers, it is determined solely in the presence of solvents because the preferred application of such prepolymers is in high-solids systems with solvent contents of 5 to 30%. "FCKW-113" is used as the solvent. However, other solvents may also be used providing they contain no NCO-reactive groups, for example dimethoxymethane, methyl acetate, pentane, dimethyl carbonate, etc.

The storage stability of the polyurethane prepolymer is determined not only by the type and production of the oleochemical polyol, but also by other factors, namely the type, reactivity and impurities of the di- or polyisocyanate, the type and concentration of the catalysts added to accelerate the NCO/OH reaction in the polyol/isocyanate addition, the type and concentration of the accelerator added for the NCO/H$_2$O reaction and also by the control of temperature during the prepolymerization. The additions of solvents, flameproofing agents and plasticizers also have an additional, but lesser effect on storage stability.

The use of basic lithium compounds as catalysts in accordance with the invention increases stability in storage several times. The invention is illustrated by the following Examples.

EXAMPLES

1. Production of Oleochemical Polyols E1 to E3 (transesterification polyols)

Castor oil, glycerol (99.5%) and lithium hydroxide are introduced into a dry reactor and stirred under nitrogen for 6 to 8 hours at 240° C. After cooling to 120° C., a vacuum (ca. 15 mbar) is applied and the reaction mixture is dried for 1 hour at that temperature. The quantities by weight of the starting materials and the properties of the transesterification polyols are set out in Table 1.

Other transesterification polyols (E5 to E7) are produced in the same way from mixtures of a) castor oil, b) rapeseed oil, c) glycerol and optionally d) dicarboxylic acid or its anhydride. Where different quantities of lithium hydroxide or different condensation conditions are used, the polyols described in the following are marked accordingly (see Table 3).

2. Production of Prepolymer Solutions

A solution of an NCO prepolymer is produced from the described polyols according to the invention by addition of plasticizers, flameproofing agents, surfactants, catalysts, polyisocyanate and a readily volatile solvent with a boiling point of −40° C. to +60° C. at 1013 mbar. The polyaddition is carried out at temperatures of +10° C. to +50° C. (after all the components have been mixed at room temperature).

The viscosity of the prepolymer solution is measured 24 hours after production of the mixture and is referred to in the following as the initial viscosity. The relative rise in viscosity is calculated from the absolute viscosities determined after storage at 20 and 50° C.

The compositions of the solutions according to the invention (in parts by weight) are shown in Tables 2 and 3 which also include Comparison Examples C1, C2, C3 and C4 (Table 4).

The results of the viscosity investigations show that the rise in viscosity is reduced several times where LiOH is used instead of KOH as the transesterification catalyst.

TABLE 1

| Oleopolyol No. | E1 | E2 | E3 |
|---|---|---|---|
| Starting materials | | | |
| Castor oil 1 F | 900 | 950 | 980 |
| Glycerol | 100 | 50 | 20 |
| LiOH.1H$_2$O | 0.07 | 0.07 | 0.07 |
| Polyol data: | | | |
| OH value, mg KOH/g | 320 | 241 | 197 |
| Lithium content, ppm | 11.5 | 11.5 | 11.5 |
| mmole/kg | 1.65 | 1.65 | 1.65 |
| Water content % | <0.2 | <0.2 | <0.2 |

TABLE 2

| Example No. | 1 | 2 | 3 | 4 |
|---|---|---|---|---|
| Polyol OHV | 320 | 241 | 197 | 320 |
| Alkali metal | Li | Li | Li | Li |
| Content, ppm | 11.5 | 11.5 | 11.5 | 11.5 |
| Content, mmole/kg | 1.65 | 1.65 | 1.65 | 1.65 |
| Oleopolyol E1 | 40.86 | | | 40.52 |
| Oleopolyol E2 | | 44.8 | | |
| Oleopolyol E3 | | | 48.13 | |
| TMCP | 54.32 | 50.28 | 46.95 | 53.28 |
| Silicone surfactant | 3.8 | 3.96 | 3.96 | 3.85 |
| DMDEE | 1.02 | 0.96 | 0.96 | 2.35 |
| OH value PC | 130.8 | 108 | 94.8 | 129.7 |
| NCO prepolymer: | | | | |
| Polyol compound | 32.4 | 36.27 | 38.86 | 32.4 |
| Caradate 30 | 47.6 | 43.73 | 41.14 | 47.6 |
| FCKW-113 | 20 | 20 | 20 | 20 |
| Prepolymer solution: | 100 | 100 | 100 | 100 |
| Data of the prepolymers: | | | | |
| NCO:OH ratio | 4.65 | 4.62 | 4.62 | 4.69 |
| DMDEE % | 0.33 | 0.35 | 0.37 | 0.76 |
| Initial viscosity mPas | 1830 | 1400 | 1510 | 1880 |
| Rise in viscosity | | | | |
| at 20° C. in %/month | 10.6 | 8.2 | 7.9 | 14.7 |
| at 50° C. in %/month | 102 | 67 | 58 | 138 |

TABLE 3

| Polyol No. | E5 | E6 | E7 |
|---|---|---|---|
| Rapeseed oil | 33 | 40 | 0 |
| Castor oil | 53 | 50 | 91 |
| Glycerol *1PO | 14 | 10 | 9 |
| LiOH.1H$_2$O | 0.007 | 0.007 | 0.007 |
| Polyol data: | | | |
| OH value | 247 | 193 | 250 |
| Lithium mmole/kg | 1.65 | 1.65 | 1.65 |
| Polyol | 42.67 | 46.67 | 42.47 |
| TMCP | 48.92 | 44.92 | 49.12 |
| Silicone surfactant | 3.82 | 3.82 | 3.82 |
| DMDEE | 0.93 | 0.93 | 0.93 |
| OH value PC | 109.4 | 93.5 | 110.2 |
| NCO prepolymer: | | | |
| Polyol compound (PC) | 36.57 | 39.75 | 36.42 |
| Caradate 30 | 44.68 | 41.5 | 44.83 |
| FCKW-113 | 18.75 | 18.75 | 18.75 |
| Prepolymer solution | 100 | 100 | 100 |
| Data of the prepolymers: | | | |
| NCO:OH ratio | 4.8 | 4.8 | 4.8 |
| DMDEE, % | 0.40 | 0.43 | 0.39 |
| Initial viscosity mPas, 25° C. | 950 | 850 | 1320 |
| Rise in viscosity | | | |
| at 20° C. in %/month | | | |
| at 50° C. in %/month | 40.1 | 45.3 | 42.5 |

TABLE 4

| | Comparison Examples | | | |
|---|---|---|---|---|
| Example No. | C1 | C2 | C3 | C4 |
| Polyol OHV | 180 | 180 | 150 | 320 |
| Alkali metal | — | — | K | K |
| Content, ppm | 0 | 0 | 15 | 15 |
| Content, mmole/kg | 0 | 0 | 0.38 | 0.38 |
| Soya polyol 180A | 48.93 | 48.5 | | |
| Aminopolyol | | | 66.4 | |

TABLE 4-continued

| | Comparison Examples | | | |
|---|---|---|---|---|
| Example No. | C1 | C2 | C3 | C4 |
| Oleopolyol V4 | | | | 40.86 |
| TMCP | 46.82 | 45.3 | 30 | 54.32 |
| Silicone surfactant | 3.82 | 3.85 | 3.6 | 3.80 |
| DMDEE | 0.93 | 2.35 | 0 | 1.02 |
| OH value PC | 88.1 | 87.3 | 99.6 | 130.8 |
| NCO prepolymer: | | | | |
| Polyol compound | 38 | 38 | 35.6 | 32.4 |
| Caradate 30 | 42 | 42 | 44.4 | 47.6 |
| FCKW-113 | 20 | 20 | 20 | 20.0 |
| Prepolymer solution | 100.00 | 100.00 | 100.00 | 100.00 |
| Data of the prepolymers: | | | | |
| NCO:OH ratio | 5.19 | 5.24 | 5.18 | 5.25 |
| DMDEE % | 0.35 | 0.89 | 0 | 0.33 |
| Initial viscosity mPas | 2130 | 2170 | 3160 | 2450 |
| Rise in viscosity | | | | |
| at 20° C. in %/month | 25.1 | 43.4 | — | — |
| at 50° C. in %/month | 309 | 480 | 223 | 241 |

Legend to the Tables

Castor oil 1 F: technical castor oil, OH value 165±5

Soya polyol 180A:
  oleochemical polyol produced from epoxidized soybean oil (epoxide content 6.1%) by reaction with methanol. OH value 180, viscosity ca. 4,000 mPas at 25° C., epoxide oxygen <0.1% by weight.

Aminopolyol:
  petrochemical polyol produced by propoxylation of triethanolamine. OH value 150, viscosity 330 mPas at 25° C., potassium content 15 ppm (expressed as metal).

TMCP: tris-(2-chloropropyl)-phosphate.

Silicone surfactant: siloxane/oxyalkylene copolymer.

DMDEE: 2,2'-dimorpholinodiethyl ether.

PC polyol compound

Caradate 30: polymer MDI of Shell AG: functionality 2.7, NCO content 31.0% by weight.

FCKW-113: 1,1,2-trichloro-1,2,2-trifluoroethane.

Glycerol·1 PO: adduct of 1 mole of glycerol and 1 mole of propylene oxide

Oleopolyol V4: polyol of 900 parts by weight of castor oil 1 F and 100 parts by weight of glycerol produced by heating in the presence of KOH. Potassium content 15 ppm, oh value 320.

What is claimed is:

1. A polyurethane prepolymer containing NCO groups, having improved storage stability, comprised of the reaction product of at least one polyol and at least one isocyanate, wherein said polyurethane prepolymer comprises about 0.35 to about 14 ppm of lithium and about 0.1 to about 2% by weight of a tertiary amine and wherein said polyurethane prepolymer is free from Na, K and other amines.

2. The prepolymer as claimed in claim 1, wherein the polyol is oleochemical.

3. The prepolymer as claimed in claim 1, wherein the polyol is obtained by transesterification of an oil selected from the group consisting of castor oil, rapeseed oil, soybean oil, epoxidized soybean oil and mixtures thereof with short-chain compounds containing about 2 to 4 about OH groups and wherein said polyol has a molecular weight of less than about 400 and optionally comprises a small quantity of dicarboxylic acids and wherein the OH value of the polyol after transesterification is about 150 to about 350.

4. The prepolymer as claimed in claim 3, wherein, to produce the polyol, up to about 4.0 mmoles of a basic lithium compound per kg of polyol are added before the transesterification.

5. The prepolymer as claimed in claim 4, wherein said basic lithium compound is lithium hydroxide.

6. The prepolymer as claimed in claim 1, wherein said tertiary amine is 2,2'-dimorpholinodiethyl ether.

7. The prepolymer as claimed in claim 1, wherein said polyisocyanate is diphenylmethane-4,4'-diisocyanate in the form a technical mixture of polymeric MDI with functionalities of about 2.3 to about 2.8.

8. A process for the production of moisture-curing adhesives or foams, wherein the improvement comprises production of moisture-curing adhesives or foams with the prepolymer claimed in claim 1.

9. A process for the production of moisture-curing solutions in non-reusable pressurized containers, wherein the improvement comprises production of moisture-curing solutions in non-reusable pressurized containers with the prepolymer of claim 1 further comprising a solvent, said solvent being selected from the group consisting of chlorine-free fluorocarbons with boiling points of about −40° C. to about +60° C., propane/butane mixtures, dimethyl ether and mixtures thereof.

* * * * *